United States Patent [19]

Jaqua et al.

[11] Patent Number: 4,638,947
[45] Date of Patent: Jan. 27, 1987

[54] PNEUMATIC BAG DEPLOYMENT OF FOLDED NOZZLE EXTENSIONS

[75] Inventors: Vance W. Jaqua, Canoga Park; Premysl Jencek, Chatsworth, both of Calif.

[73] Assignee: Rockwell International Corporation, El Segundo, Calif.

[21] Appl. No.: 781,840

[22] Filed: Sep. 30, 1985

[51] Int. Cl.⁴ .................................................. F02K 1/08
[52] U.S. Cl. ...................................... 239/265.43; 60/271
[58] Field of Search .................... 239/265.11, 265.15, 239/265.19, 265.33, 265.43; 60/242, 271

[56] References Cited

U.S. PATENT DOCUMENTS

| | | | |
|---|---|---|---|
| 3,596,465 | 8/1971 | Paine | 60/271 |
| 3,711,027 | 1/1973 | Carey | 239/265.19 |
| 4,125,224 | 11/1978 | Carey | 239/265.43 |
| 4,162,040 | 7/1979 | Carey | 239/265.33 |
| 4,184,238 | 1/1980 | Carey | 29/157 |
| 4,272,956 | 6/1981 | Lamere et al. | 239/265.15 X |
| 4,313,567 | 2/1982 | Feight | 239/265.33 |
| 4,387,564 | 6/1983 | Carey | 60/242 |
| 4,480,437 | 11/1984 | Gauge | 239/265.43 X |

*Primary Examiner*—Andres Kashnikow
*Attorney, Agent, or Firm*—H. Fredrick Hamann; Harry B. Field; Lawrence N. Ginsberg

[57] ABSTRACT

An apparatus and method for deploying and forming a rocket engine nozzle extension 10. A pneumatic bag 18 within the fixed nozzle 14 of a rocket engine is inflated to push and unfold the nozzle extension 10. The nozzle extension 10 is of the type which attaches to the end of the fixed nozzle 14 and is turned inwardly toward the central axis of said fixed nozzle 14 and folded along creases so that prior to it being extended the nozzle extension 10 is in a stowed configuration inside the fixed nozzle 14. After the nozzle extension 10 is completely formed, pneumatic bag 18 may be jettisoned by firing the rocket engine or by a mechanical releasing mechanism.

10 Claims, 7 Drawing Figures

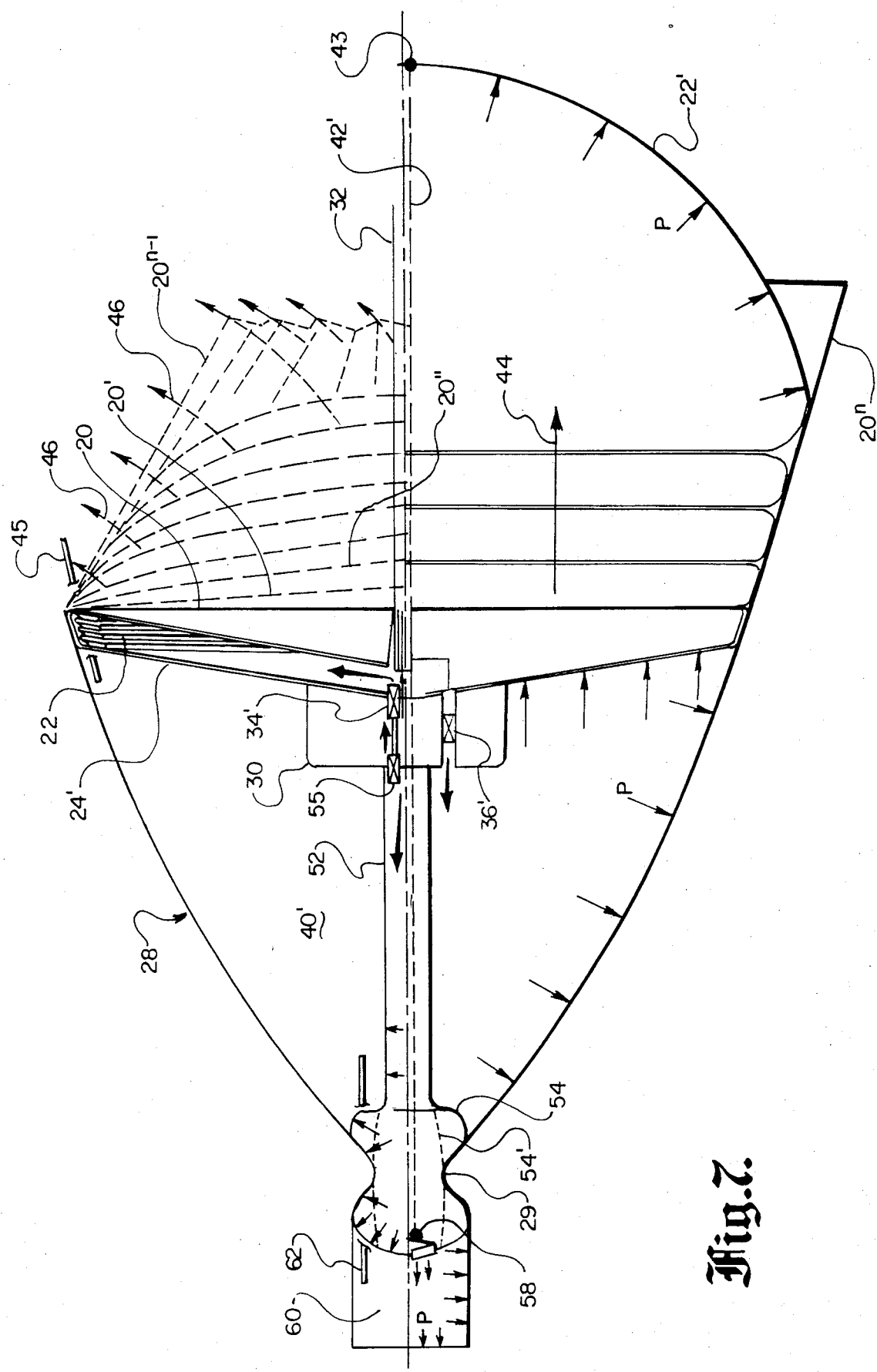

PNEUMATIC BAG DEPLOYMENT OF FOLDED NOZZLE EXTENSIONS

BACKGROUND OF THE INVENTION

1. Field of the Invention

This invention relates to an apparatus and means for deploying a rocket engine nozzle extension and especially to pneumatic means for deploying a nozzle extension.

2. Description of the Prior Art

Rocket engines for vehicles operating around space stations, orbital transfer vehicles, and engines of high-orbit satellites use, during their operation, high expansion-ratio nozzles of greater length than the inner volume of their carrier allows. Therefore, the engine overall length must be reduced during transport, and then extended for operation. Several types of nozzle extensions and nozzle extension means have been developed. For example, co-applicant, P. Jencek, has filed co-pending U.S. application Ser. No. 644,412, which discloses a telescoping, sleeve section around the fixed nozzle of the rocket engine. The sleeve is driven to form the extension. The extendible sleeve is advanced by inflating a pressure vessel which drives a support plate. The support plate supports radially-extending locking arms which engage the rear end of the nozzle extension. After the nozzle has been extended, a second pressure vessel and latching mechanism is utilized to jettison all nozzle-extending and deployment components out of the extended nozzles.

U.S. Pat. No. 4,125,224, issued to L. F. Carey, discloses a skirt-like nozzle extension. The device is adapted to be pleat-folded in a retracted position along a plurality of crease lines and subsequently unfolded to assume an unfolded frusto-conical shape. Carey discloses two methods for extending the nozzle. In a first method, when the rocket engine is fired, the initially developed gases impinge against the skirt and push it outwardly. However, with this method the skirt is likely to be damaged because it is caught in the flow of the exhaust and it is unlikely that the creases can be ironed out merely by the exhaust. In addition, the interference with the exhaust flow created by the skirt results in stability problems and lost performance. In a second method for extending the nozzle, actuators operable by a firing sequence control system extend the nozzle after ignition of the engine.

SUMMARY OF THE INVENTION

The present invention provides an apparatus and method for deploying and forming a rocket engine nozzle extension. The nozzle extension, prior to being extended, is in a stowed configuration inside the fixed nozzle of the rocket engine. The nozzle extension is attached to the end of the fixed nozzle and is turned inwardly toward the central axis of the fixed nozzle and folded along pleats. It is extended by inflating an inflatable bag within the fixed nozzle. While inflating, the inflatable bag pushes the nozzle extension rearwardly, unfolding the nozzle extension and ironing out the creases to assure the proper efficient aerodynamic shape. After it is completely formed, the nozzle extension may be jettisoned by firing the rocket engine or by a releasing mechanism within the fixed nozzle.

OBJECTS OF THE INVENTION

A principal object of the invention is therefore to efficiently unfold a previously-stowed rocket engine nozzle extension.

Another object is to effectively iron out the folds of the nozzle extension to assure good aerodynamic performance of the extended nozzle.

Another object is to provide a means for unfolding the nozzle extension, such means which may be easily jettisoned after the nozzle extension has been formed.

Still another object is to save storage space in space vehicles by reducing the volume required for extension forming means.

Other objects, advantages and novel features of the present invention will become apparent from the following detailed description of the invention when considered in conjunction with the accompanying drawing.

BRIEF DESCRIPTION OF THE DRAWINGS

FIG. 7 is a schematic illustration of another inflation and jettisoning mechanism which utilizes a small balloon in the throat of the fixed nozzle for added support.

The same elements or parts throughout the figures of the drawing are designated by the same reference characters, while equivalent elements bear a prime designation.

DETAILED DESCRIPTION OF THE PREFERRED EMBODIMENTS

Figure 1:
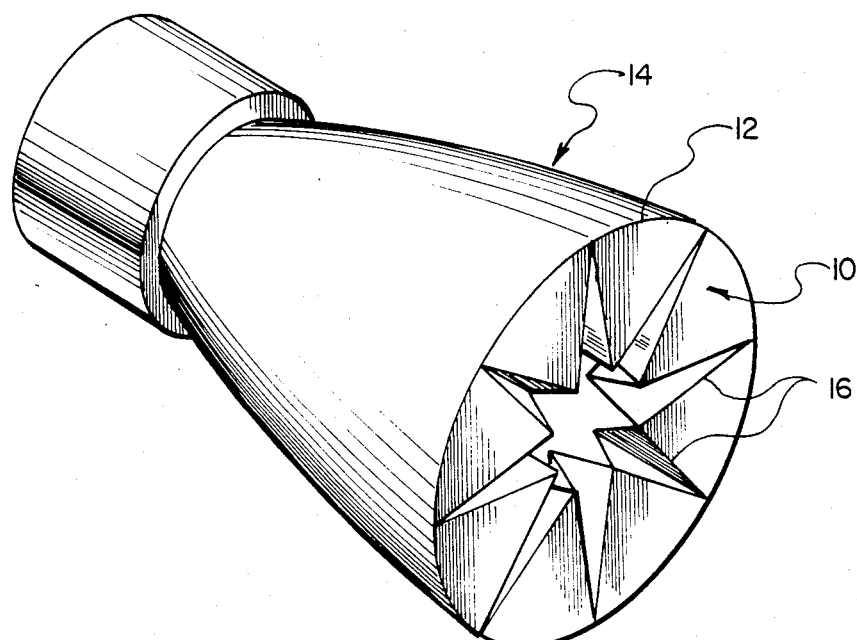
FIG. 1 is a schematic illustration of the nozzle extension in a stowed configuration.

Referring to the drawings and to the characters of reference marked thereon, FIG. 1 illustrates the nozzle extension 10 of a rocket engine in the stowed configuration prior to being extended. Nozzle extension 10 is welded or otherwise permanently attached to the end 12 of a conically or bell shaped divergent fixed nozzle 14. The nozzle extension 10 is fabricated of thin sheet, ductile, heat resistant material such as Columbium alloy. It is turned inwardly toward the central axis of the fixed nozzle 14 and folded along pleats 16 and in that position can be stowed during transport, thus saving valuable space within the transport carrier.

Figure 2:
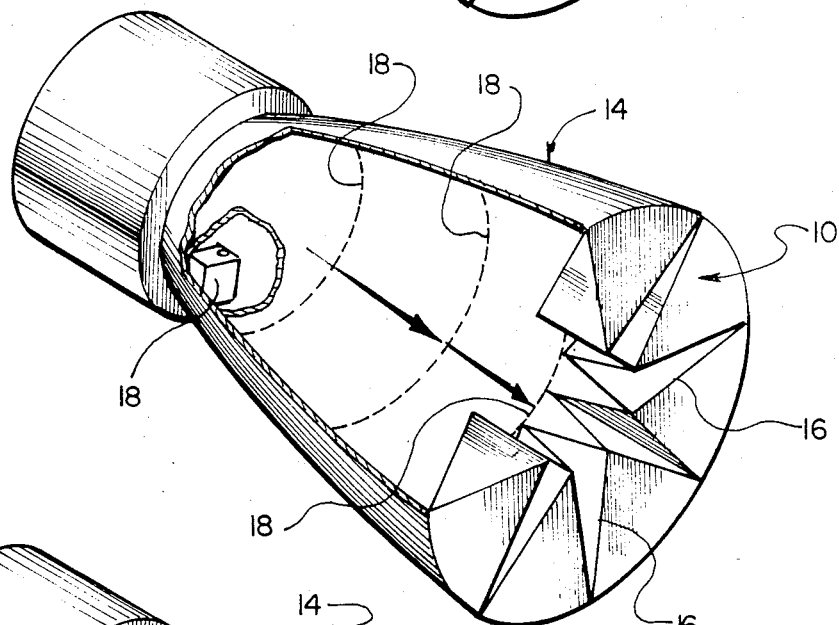
FIG. 2 is a cross-sectional cut-away schematic illustration of the fixed nozzle showing the inflatable bag in various stages of inflation just prior to deployment of the nozzle extension.

After being transported, a pneumatically-inflatable bag 18, located within the fixed nozzle 14, preferably made of a burnable stretchable membrane material such as rubber base composite is inflated. As the inflatable bag 18 expands, the nozzle extension 10 is unfolded and pushed rearwardly away from the fixed nozzle 14. FIG. 2 shows the inflatable bag 18 in various stages of inflation just prior to its contact with nozzle extension 10.

The inflatable bag 18 may be attached to the fixed nozzle by glue or other securing means.

Figure 3:
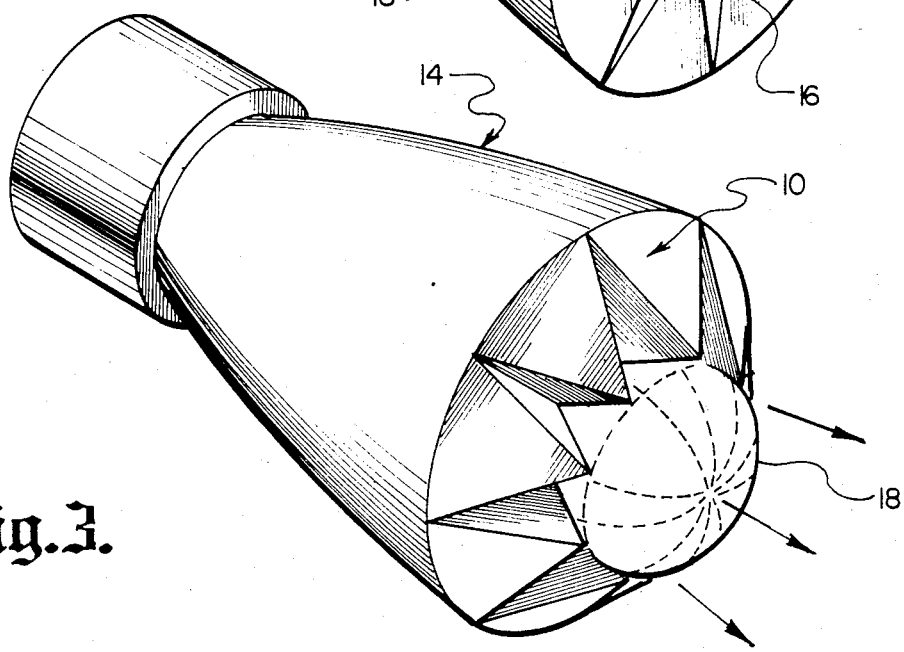
FIG. 3 is a schematic illustration of the nozzle extension partially deployed, and the inflatable bag partially inflated.
Figure 4:
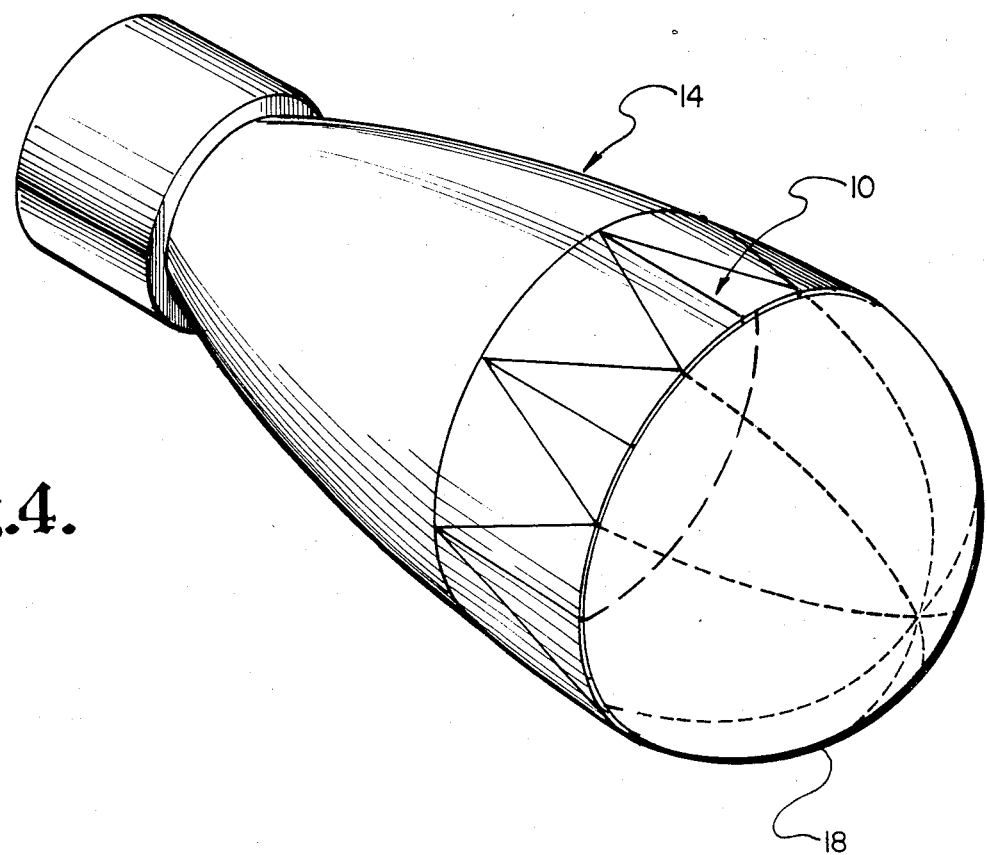
FIG. 4 is a schematic illustration of the nozzle extension fully formed and the inflatable bag ready to be jettisoned.
Figure 5:
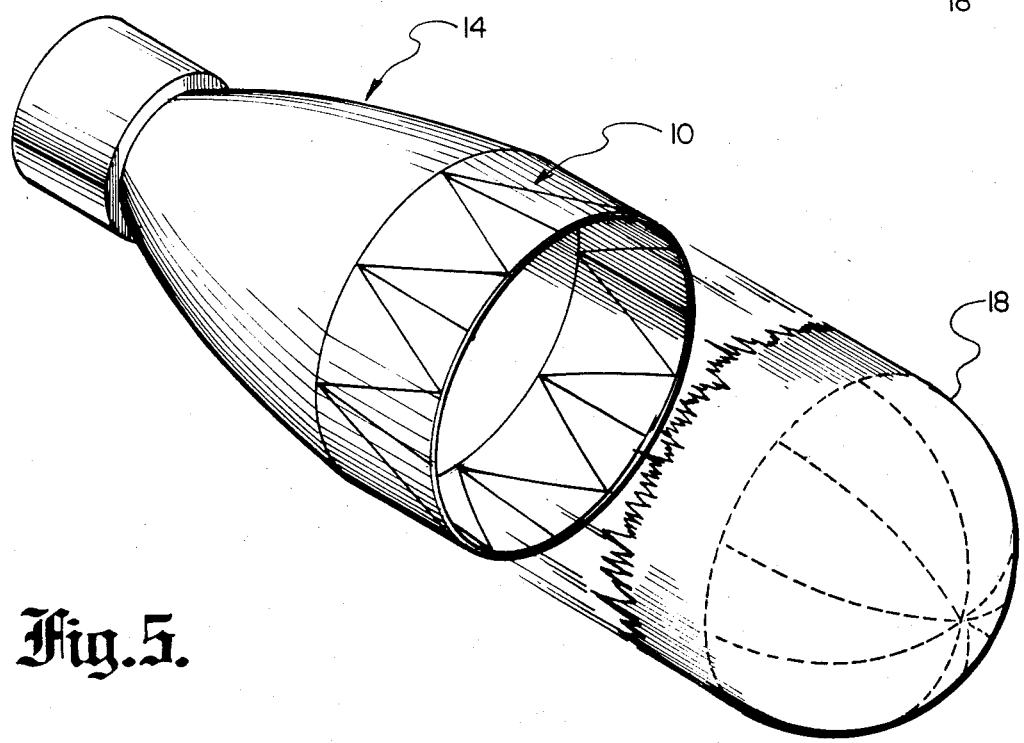
FIG. 5 is a schematic illustration of the nozzle extension fully formed and the inflatable bag being jettisoned.

In FIG. 3 inflatable bag 18 has made contact with and has partially extended nozzle extension 10. In FIG. 4 the nozzle extension 10 is shown fully extended. Any wrinkles have been ironed out by the force of the inflatable bag 18 and the inflatable bag 18 is in position to be jettisoned. The inflatable bag 18 may be removed by firing the engine and simply burning it away, or other jettisoning means described below. In FIG. 5, inflatable bag 18 is shown just subsequent to being jettisoned.

Figure 6:
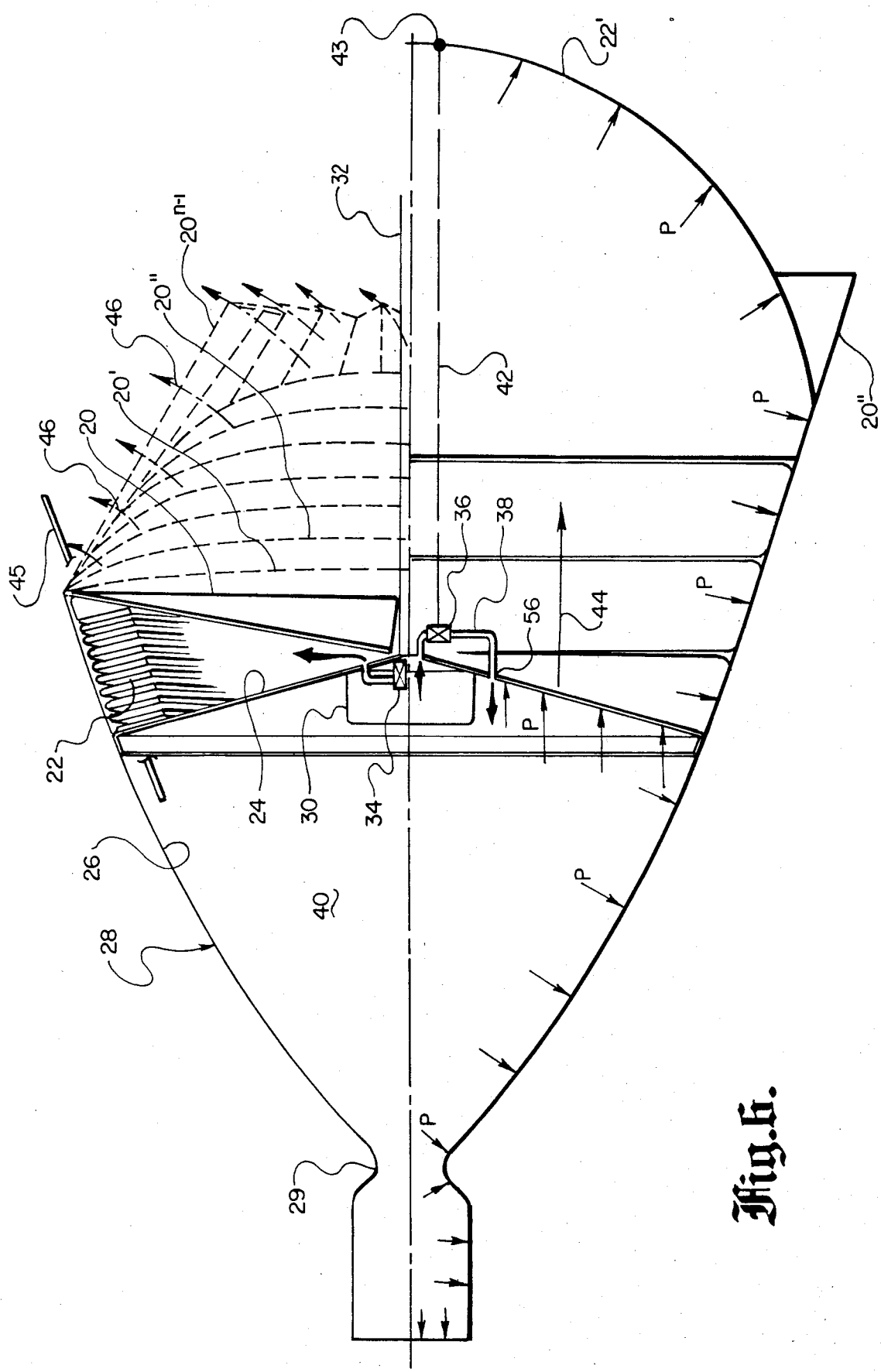
FIG. 6 is a schematic illustration of a specific embodiment of an inflation and jettisoning mechanism for the nozzle extension partially cutaway to show the internal construction.

FIG. 6 illustrates a specific embodiment of a deployment and jettison means for an nozzle extension 20. A folded inflatable bag 22 is attached to a semi-rigid conical back plate 24. It rests against the inner face 26 of a fixed nozzle 28 and prevents inflation of the inflatable bag 22 toward the throat 29 of the fixed nozzle 28. The conical back plate 24 may be slightly glued to the fixed nozzle 28. Conical back plate 24 carries a gas accumulator 30. The gas accumulator 30 is accessed through the center opening between the folds of the nozzle extension 20 by an actuator 32, which controls the actions of a valve 34. Valve 34 controls the flow of gas from the gas accumulator 30 into the inflatable bag 22. A second valve, valve 36, controls the flow of gas through a bypass 38 from the gas accumulator 30 to chamber 40 within the fixed nozzle 28. Valve 36 is activated by a line 42 attached to the bag 22 at point 43, which is a point near maximum bag inflation. The length of line 42 is slightly shorter than the distance between the valve 36 and point 43.

Prior to extension of the nozzle extension 20, while the rocket is ascending to the deployment altitude, the chamber 40 behind the conical plate 24 is vented by tube 45 to prevent trapped ambient gases from expelling the conical plate 24, gas accumulator 30, and inflatable bag 22 as atmospheric pressure reduces with altitude. When the deployment altitude is reached, actuator 32 activates valve 34 and gas from gas accumulator 30 gradually inflates the bag 22 (see arrow 44). The bag 22 simultaneously pushes the nozzle extension 20 (see arrows 46 and phantom lines $20'$, $20''$ ... $20^{n-1}$) to its fully extended position $20^n$. When the inflatable bag is fully inflated, as represented at $22'$, and the nozzle extension 20 fully extended, line 42 activates valve 36 and gas flows from the gas accumulator and from the inflated bag 22 into chamber 40 behind the semi-rigid back plate 24. The resulting pressure forces the assembly comprising conical plate 24, inflated bag 22, and gas accumulator 30 to exit the fixed nozzle 28 and nozzle extension 20. This assembly is further propelled by the gas jet exiting from the port 56 behind valve 36.

FIG. 7 illustrates another specific implementation of a deployment and jettison means for a nozzle extension. The dispositions of the inflatable bag 22, gas accumulator 30, and semi-rigid conical back plate $24'$ are similar to their dispositions in FIG. 6. Except, conical back plate $24'$ has its apex directed toward the throat, in order to provide better seating of the conical back plate $24'$ within the fixed nozzle 28. Furthermore, the FIG. 7 embodiment includes a centrally disposed rigid post 52 and a small inflatable balloon 54. The small balloon 54 is in the throat area and the rigid post 52 extends from small balloon 54 to the gas accumulator 30. The small balloon 54 is inflated at its time of installation by valve means 55. The small balloon 54 and rigid post 52 serve to stabilize the gas accumulator/semi-rigid back plate/inflatable bag assembly with respect to the fixed nozzle 28.

At the time of deployment of the nozzle extension 20, as in the previous embodiment, valve $34'$ is activated thereby pressurizing the inflatable bag 22 and causing the nozzle extension 20 to be extended. When the nozzle extension 20 is fully extended, line $42'$ activates valve $36'$ and flip valve 58. When flip valve 58 is opened, the small balloon 54 deflates approximately to position $54'$ as its gas enters chamber 60. The gas flow through valve $36'$ from inflated bag 22 and gas accumulator 30 enters chamber $40'$.

The resulting pressure acts on the conical back plate $24'$ and pushes it, as well as the rest of the deployment mechanism out of the nozzle extension 20. As in the previous embodiment, a tube 45 is utilized to relieve the pressure from trapped ambient gases in chamber $40'$. Additionally, in the present embodiment, tube 62 is utilized to vent ambient gases from chamber 60.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An apparatus for deploying and forming a rocket engine nozzle extension prior to the rocket engine being fired, wherein said nozzle extension is attached to the end of a fixed nozzle and is turned inwardly toward the central axis of said fixed nozzle and folded along pleats so that prior to it being extended said nozzle extension is in a stowed configuration inside said fixed nozzle, comprising:
   an inflatable bag within said fixed nozzle wherein prior to the rocket engine being fired said bag is inflated, concurrently unfolding said nozzle extension and pushing said nozzle extension rearwardly away from said fixed nozzle;
   means for inflating said inflatable bag; and
   means for jettisoning said inflatable bag.

2. The apparatus of claim 1 wherein said means for jettisoning said inflatable bag comprises firing the rocket engine to burn said inflatable bag away.

3. The apparatus of claim 1 wherein said means for jettisoning said inflatable bag comprises a releasing mechanism associated with said fixed nozzle.

4. The apparatus of claim 1 wherein said inflatable bag is comprised of a stretchable membrane material.

5. The apparatus of claim 4 wherein said stretchable membrane material is a rubber base composite.

6. The apparatus of claim 1 wherein said means for inflating said inflatable bag includes a gas accumulator in fluid communication with said inflatable bag.

7. The apparatus of claim 6 wherein said means for inflating said inflatable bag further includes a plate, located within said fixed nozzle, for supporting said gas accumulator, said plate permitting only rearward inflation of said inflatable bag thereby forming an empty chamber between a throat of said rocket engine and said inflatable bag when said inflatable bag is inflated.

8. The apparatus of claim 7 wherein said jettisoning means includes valve means for transferring gas from said inflatable bag to said chamber, the resulting pressure forcing said plate, said gas accumulator, and said inflatable bag to exit said fixed nozzle and nozzle extension.

9. The apparatus of claim 8 wherein said jettisoning means further includes a small balloon which is securely inflated within said throat prior to the time said inflatable bag is jettisoned, said small balloon connected to said gas accumulator by a rigid post, thereby providing structural integrity for said plate, gas accumulator, and inflatable bag;

wherein, when the gas is transferred from said inflatable bag to said chamber, said small balloon becomes at least partially deflated thereby allowing it be jettisoned with the remainder of said jettisoning means.

10. A method for deploying and forming a rocket engine nozzle extension prior to the rocket engine being fired, wherein said nozzle extension is attached to the end of a fixed nozzle and is turned inwardly toward the central axis of said fixed nozzle and folded along pleats so that prior to it being extended said nozzle extension is in a stowed configuration inside said fixed nozzle, comprising the steps of:

inflating an inflatable bag located within said fixed nozzle for concurrently unfolding said nozzle extension and pushing said nozzle extension rearwardly away from said fixed nozzle; and jettisoning said inflatable bag.

\* \* \* \* \*